Feb. 3, 1959        K. W. MARBLE        2,871,754
REARVIEW MIRROR ATTACHMENT
Filed June 11, 1954
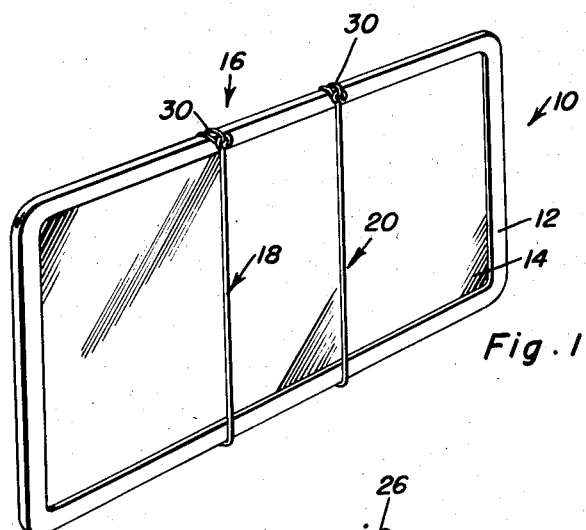
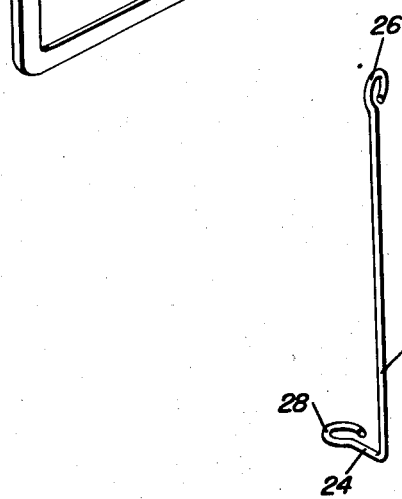
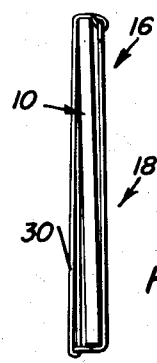
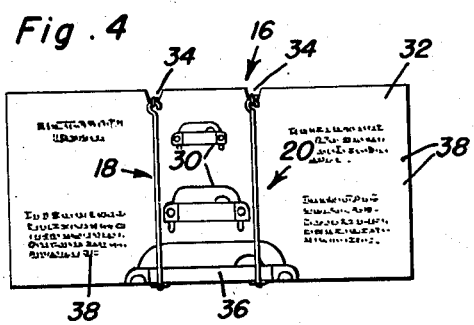
Kingsley W. Marble
INVENTOR.
BY *[signatures]*
                  Attorneys 2,871,754

REARVIEW MIRROR ATTACHMENT

Kingsley W. Marble, Athol, Mass.

Application June 11, 1954, Serial No. 436,017

1 Claim. (Cl. 88—2.2)

This invention relates in general to improvements in accessories for vehicles, and more specifically to a rear view mirror attachment.

Although the average driver has sufficient depth perception to determine the distance of a car in front of him, he is normally unable to judge the distance of a car trailing him. Inasmuch as the closeness of a trailing vehicle is very often an important factor in safe driving, it is highly desirable that the average driver be able to easily determine whether or not a trailing vehicle is trailing at a safe distance.

It is therefore the primary object of this invention to provide an attachment for vehicles which may be utilized to readily ascertain whether or not a trailing vehicle is a safe distance behind.

Another object of this invention is to provide an improved device which may be quickly and easily attached to existing rear view mirrors whereby through the use of the rear view mirror and the attachment the relative distance of a trailing vehicle may be determined.

A further object of this invention is to provide an improved rear view mirror attachment which is of such nature whereby it may be utilized to determine the approximate distance of a trailing vehicle, the attachment being of such nature whereby it may be quickly and easily adjusted for all drivers.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a perspective view of a rear view mirror and shows the same provided with the rear view mirror attachment which is the subject of this invention;

Figure 2 is an enlarged perspective view of a gage rod forming one-half of the rear view mirror attachment;

Figure 3 is a side elevational view of the rear view mirror of Figure 1 and shows the relationship of a gage rod with respect thereto, the attachment means for the rear view mirror being omitted; and Figure 4 is an elevational view on a reduced scale of the rear view mirror attachment mounted on a display card.

Referring now to the drawings in detail, it will be seen that there is illustrated a conventional rear view mirror which is referred to in general by the reference numeral 10. The rear view mirror 10 includes a frame 12 in which is mounted a mirror 14.

Carried by the rear view mirror 10 is the rear view mirror gage which is the subject of this invention, the gage being referred to in general by the reference numeral 16. The gage 16 is formed of a pair of spaced parallel, first and second gage rods 18 and 20. Inasmuch as the gage rods 18 and 20 are identical, only the gage rod 18 will be described in detail.

As is best illustrated in Figure 2, the gage rod 18 includes a vertical leg 22 and a horizontal leg 24. The horizontal leg 24 is relatively short as compared with the vertical leg 22 and is adapted to underlie a lower edge of a mirror, such as the mirror 10. The vertical leg 22 terminates at its upper end in a vertically disposed hook 26 whereas the horizontal leg 24 terminates at its rear end in a horizontally disposed hook 28.

In order that the gage rods 18 and 20 may be conveniently secured to the rear view mirror 10, there is provided a resilient band 30 for each of the gage rods. Each of the resilient bands 30 extends between and is engaged with the hooks 26 and 28 of its respective gage rod.

Referring now to Figure 4 in particular, it will be seen that there is illustrated a display card 32 on which is mounted the rear view mirror gage 16. It will be noted that the upper edge of the display card 32 is provided with spaced notches 34 to facilitate the positioning of the gage rods 18 and 20. In order to illustrate the relationship of trailing vehicles at various distances behind the vehicle on which the rear view mirror gage 16 is a part, there is imprinted on the display card 32 several vehicles 36. The vehicles 36 are centered relative to the space between the gage rods 18 and 20 and are of varying sizes. The display card 32 also is provided with suitable indicia 38 which indicates the relative position of the vehicles 36.

The rear of the display card 32 is provided with suitable instructions for the mounting of the rear view mirror gage 16. It is to be understood that the spacing between the gage rods 18 and 20 is proportional to the distance between the driver's eyes and the rear view mirror 10. Inasmuch as the proper spacing has been predetermined, it is merely necessary for a driver of a vehicle to measure the distance between his eyes, when in the normal driving position, and the rear view mirror 10. When this has been determined, by reviewing a convenient table (not shown) normally placed on the rear of the display card 32, the gage rods 18 and 20 may be properly spaced. When the gage rods 18 and 20 are properly spaced and a trailing vehicle has its image filling the space between the gage rods 18 and 20, such as the middle vehicle 36 of Figure 4, then the vehicle will be a predetermined distance behind the driver, for example, fifty feet, which is considered a safe trailing distance. When the vehicle is closer, it will appear as the lower vehicle 36 in Figure 4 and when it is a distance in excess of fifty feet, it will appear as the upper vehicle 36 in Figure 4.

In order that the attachment may be utilized for night driving, it is highly desirable that the gage rods 18 and 20 be formed of luminescent material.

Not only may the present invention be utilized to determine whether a vehicle is at a safe trailing distance, but by watching the rate of the increase in width of the image of an approaching vehicle using the rods 18 and 20 as guides, the rate of overtaking may be readily determined.

What is claimed as new is as follows:

The combination of an automobile rear view mirror for reflecting therein the image of a trailing vehicle, and a pair of adjustably spaced vertical gauge rods traversing the front surface of the mirror, and resilient means adjustably mounting said rods on the front surface of the mirror for spacing said rods apart laterally in correspondence with the width of the image in the mirror when the trailing vehicle is at a predetermined rearward distance from the automobile and the said image width being as viewed by the eye of a driver at a given normal distance from the mirror, said resilient means comprising right angled terminally hooked lower ends on said rods extending under the bottom edge of the mirror and upper hooked ends on the rods extending below the top edge of the mirror, and a pair of resilient bands extending across the back of the mirror and looped through the hooked ends of the rods and over the top edge of the mirror to pull said right angled ends against the bottom edge of the mirror whereby said resilient bands frictionally grip the top edge of the mirror and said right angled ends grip the bottom edge of the mirror to hold said rods in laterally spaced positions over the front surface of the mirror.

References Cited in the file of this patent

UNITED STATES PATENTS

| | | |
|---|---|---|
| 761,033 | Cross | May 24, 1904 |
| 1,311,253 | Stern | July 29, 1919 |
| 1,401,591 | Doggett | Dec. 27, 1921 |
| 1,605,884 | Wilkinson | Nov. 2, 1926 |
| 2,392,979 | Douden | Jan. 15, 1946 |
| 2,639,641 | Piwczynski | May 26, 1953 |
| 2,649,839 | Condon | Aug. 25, 1953 |